United States Patent
Mehrvar et al.

(10) Patent No.: US 10,454,583 B2
(45) Date of Patent: Oct. 22, 2019

(54) SYSTEM AND METHOD FOR COMMUNICATION NETWORK SERVICE CONNECTIVITY

(71) Applicants: Hamid Mehrvar, Ottawa (CA); Mohammad Mehdi Mansouri Rad, Kanata (CA)

(72) Inventors: Hamid Mehrvar, Ottawa (CA); Mohammad Mehdi Mansouri Rad, Kanata (CA)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 15/430,070

(22) Filed: Feb. 10, 2017

(65) Prior Publication Data
US 2017/0310395 A1 Oct. 26, 2017

Related U.S. Application Data

(60) Provisional application No. 62/326,632, filed on Apr. 22, 2016.

(51) Int. Cl.
| | | |
|---|---|---|
| *H04B 10/27* | (2013.01) | |
| *H04B 10/079* | (2013.01) | |
| *H04J 14/02* | (2006.01) | |

(52) U.S. Cl.
CPC ....... *H04B 10/27* (2013.01); *H04B 10/07953* (2013.01); *H04J 14/0257* (2013.01); *H04J 14/0267* (2013.01); *H04J 14/0271* (2013.01)

(58) Field of Classification Search
CPC .. H04B 10/27; H04B 10/07953; H04B 10/00; H04B 10/07955; H04J 14/0257; H04J 14/0267; H04J 14/0271; H04J 14/02
See application file for complete search history.

(56) References Cited

U.S. PATENT DOCUMENTS

| | | | |
|---|---|---|---|
| 2010/0014859 A1* | 1/2010 | D'Alessandro | H04J 14/0284 |
| | | | 398/48 |
| 2010/0166421 A1 | 7/2010 | Hashiguchi et al. | |
| | | (Continued) | |

FOREIGN PATENT DOCUMENTS

| | | |
|---|---|---|
| CN | 102238060 A | 11/2011 |
| CN | 102652406 A | 8/2012 |
| | (Continued) | |

OTHER PUBLICATIONS

International Search Report dated May 27, 2017 for corresponding International Application No. PCT/CN2017/077505 filed Mar. 21, 2017.

(Continued)

*Primary Examiner* — Ted M Wang

(57) ABSTRACT

A method for assigning a network path after receiving a connection request to connect a first node with a second node of a network. The method including evaluating a network utilization parameter of the network, such as a network load or blocking probability, at that point in time. If the network utilization parameter is below a minimum threshold level, the method includes carrying out the steps of identifying a set of n network paths through the network that connect the first node with the second node and are absent non-linear links, performing network path selection by selecting p network paths from the set of n network paths that have the best linear OSNR, and, selecting a network path from the set of p network paths that balances the wavelength utilization between the first node and the second node of a network.

14 Claims, 11 Drawing Sheets

(56) References Cited

U.S. PATENT DOCUMENTS

| | | | |
|---|---|---|---|
| 2013/0028597 A1 | 1/2013 | Yabin et al. | |
| 2013/0236169 A1* | 9/2013 | Gaudette | H04B 10/0793 398/25 |
| 2014/0099119 A1* | 4/2014 | Wei | H04J 14/0257 398/79 |

FOREIGN PATENT DOCUMENTS

| | | |
|---|---|---|
| CN | 105210313 A | 12/2015 |
| EP | 1895686 A1 | 3/2008 |
| JP | 2007082086 A | 3/2007 |
| JP | 2012119732 A | 6/2012 |

OTHER PUBLICATIONS

S. Azdolmolky et al., "Experimental Demonstration of an Impairment Aware Network Planning and Operation Tool for Transparent/Translucent Optical Networks," J. Lightwave Tech., vol. 29, No. 4, p. 439 (2011).

C. Vijaya et al., "Physical Layer Impairment Aware Routing in WDM Optical Networks: Issues and Challenges," IEEE Com. S&T, vol. 11, p. 109 (2009).

R. Cardillo et al., "Considering Transmission Impairments in Configuring Wavelength Routed Optical Networks," OFC, OFG6 (2006).

M. Angelou et al., "Benefits of Implementing a Dynamic Impairment Aware Optical Networks: Results of EU Project DICONECT," IEEE Com. Mag., vol. 50 (2012).

H. Zang et al., "A Review of Routing and Wavelength Assignment Approaches for Wavelength-Routed Optical WDM Networks," Optical Networks Mag., p. 47 (2000).

Y. Pointurier et al., "Cross Layer Adaptive Routing and Wavelength Assignment in All-Optical Networks," IEEE J. Sel. Areas Com., vol. 26, No. 6, p. 1 (2008).

A. G. Rahbar, "Review of Dynamic Impairment-Aware Routing and Wavelength Assignment Techniques in All-Optical Wavelength Routed Networks," IEEE Com. Surveys & Tutorials, vol. 14, No. 4, p. 1065 (2012).

S. Azdolmolky et al., "A Dynamic Impairment Aware Networking Solution for Transport Mesh Optical Networks," IEEE Com. Magazine, vol. 47, No. 5. p. 38, (2009).

M. Wang, S. Li, Eric W. M. Wong and M. Zukerman, "Performance Analysis of Circuit Switched Multi-service Multi-rate Networks with Alternative Routing," IEEE/OSA Journal of Lightwave Technology, vol. 32, No. 2, pp. 179-200, Jan. 2014.

S. Azdolmolky etal., "A Survey on Physical Layer Impairments Aware Routing and Wavelength Assignment Algorithms in Optical Networks," Computer Networks, Elsevier, vol. 53, p. 926 (2009).

Takehiro Tsuritani, Study on GMPLS-controlled Translucent WSON using OSNR-based Impairment Aware-RWA Algorithm, vol. 109 No. 104, IEICE Technical Report, Japan, The Institute of Electronics, Information and Communication Engineers, Jun. 18, 2009, pp. 51-56, with English abstract and from the examiner opinion for cit1-3.

Shinsuke Nagai, A Dynamic Light-path Establishment Scheme with Low-Blocking Probability on based Wavelength Assignment Information in WDM networks, Communication 2, Proceedings of the 2006 IEICE General Conference, Mar. 8, 2006, p. 12, B-6-12, with English abstract from the examiner opinion for cit1-3.

Family Patent Application No.: 2018-555166, Sayaka Haoka: Notice of Reason(s) for Rejection, English translation of the examiner opinion for cit1-3. dated Aug. 13, 2019. total 6 pages.

* cited by examiner

SYSTEM AND METHOD FOR COMMUNICATION NETWORK SERVICE CONNECTIVITY

REFERENCE TO RELATED APPLICATIONS

The present application claims priority from U.S. Provisional Patent Application No. 62/326,632, filed on 22 Apr. 2016 and incorporated herein by reference in its entirety.

FIELD OF THE INVENTION

The present invention pertains to the field of communication networks and in particular to a system and method for routing and wavelength assignment in optical networks.

BACKGROUND

Next generation optical networks incorporate Physical Layer Impairment (PLI) aware routing and spectrum assignment (RSA) strategies to improve connection performance. PLI-aware RSA strategies require a large amount of physical layer data processing to detect and avoid impairments present in networks. Traditionally strategies have been based on maximizing network utilization (or minimizing a blocking probability). The main techniques employed include any one of: fixed routing (shortest path/fewest links), alternate routing, and adaptive routing.

Fixed routing requires the simplest calculations (shortest path length or fewest nodes) but leads to a higher blocking probability for a given network load. Alternate routing involves setting up at least a primary path and a secondary path. In the case of congestion on the primary path, the network can switch the traffic to the secondary path. Alternate routing requires real-time monitoring of network loads, and real-time determination of a "best" current network path. Adaptive routing is more efficient for data services as it includes consideration of congestion or failure of network links when making a network path decision.

Heuristic RSA schemes may combine both routing and wavelength assignment in a single optimization algorithm, but tend to be computationally intensive in comparison with fixed path routing and alternate routing methods. Accordingly, heuristic schemes are only rarely used (for instance at initial setup of permanent or for long-life connections).

A difficulty with the prior art solutions has been that there is a trade-off between optimum pathing and the computational load required to achieve that pathing. Theoretically optimal pathing may take a noticeably longer period of time to establish a connection between parties. From the communicating parties' perspective, the network speed is a function of both the time to establish the connection and the transfer speeds across the network once the connection has been established.

There is a need for an improved method of routing and wavelength/spectrum assignment for optical networks.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

In an embodiment, a method is provided for assigning a network path. The method may include receiving a connection request to connect a first node with a second node of a network. A network utilization parameter of the network may be evaluated to determine whether it is above or below a minimum threshold level. If the network utilization parameter is below the minimum threshold level, the method may include identifying a set of network paths through the network that connect the first node with the second node and that have no link with non-linearity, performing network path selection by selecting p network paths from the set of n network paths that have the best linear OSNR, and, selecting a network path from the set of p network paths that balances the wavelength utilization between the first node and the second node of a network. In an aspect, the method may further comprise identifying the set of network paths when the network utilization parameter is above a maximum threshold level. In an aspect, the network utilization parameter may comprise at least one of: a network load factor; a network congestion level; and a measure of network blocking probability.

In an implementation, a method is provided for a network routing and spectrum assignment (RSA) element of a Path Computation Element (PCE) to provide physical layer impairment (PLI) aware network path assignment on a communication network. The RSA element may assign a network path, from an available set of n network paths, to connect a first node and a second node of a network. In some aspects, the method may be triggered by the RSA element receiving a connection request to connect a first node with a second node of the network. The method may include evaluating a network utilization parameter of the network. In some aspects, the network utilization parameter is based on at least one of: a network blocking probability; a network load; and, a network congestion metric. If the network utilization parameter is below a minimum utilization threshold level, the network path assignment may avoid non-linear calculations. For instance, the method may include identifying network paths that exclude non-linear links and assigning the network path from the identified network paths with the highest linear OSNR. Alternatively, if the network utilization parameter is above the minimum utilization threshold level, the network path assignment may include non-linear calculations to better select a suitable network path assignment. In some aspects, the network path assignment may selectively identify a sub-set of available network paths based on a linear evaluation, and then perform the non-linear calculations on the identified sub-set of network paths. For instance, the method may include identifying a sub-set of network paths with the highest linear OSNR and assigning the network path from the identified sub-set of network paths based on the highest combination of linear OSNR and non-linear OSNR.

In an embodiment, a routing and spectrum assignment (RSA) element is provided. The RSA element operative to provide physical layer impairment (PLI) aware network path selection on a Transport Software-Defined Network (T-SDN). In an embodiment, the RSA element may be operative to: receive a connection request to connect a first node with a second node of the T-SDN; receive OSNR measurements from controllers in communication with links of the T-SDN; receive a network utilization parameter for the T-SDN; identify a set of n network paths that connect the first node with the second node; and, select a network path connecting the first node with the second node based on the received OSNR measurements and the received network utilization parameter.

In accordance with an aspect of the present invention, there is provided a network for relaying data over a communication network.

BRIEF DESCRIPTION OF THE FIGURES

Further features and advantages of the present invention will become apparent from the following detailed description, take in combination with the appended drawings, in which.

It will be noted that throughout the appended drawings, like features are identified by like reference numerals.

DETAILED DESCRIPTION OF THE INVENTION

Figure 1:
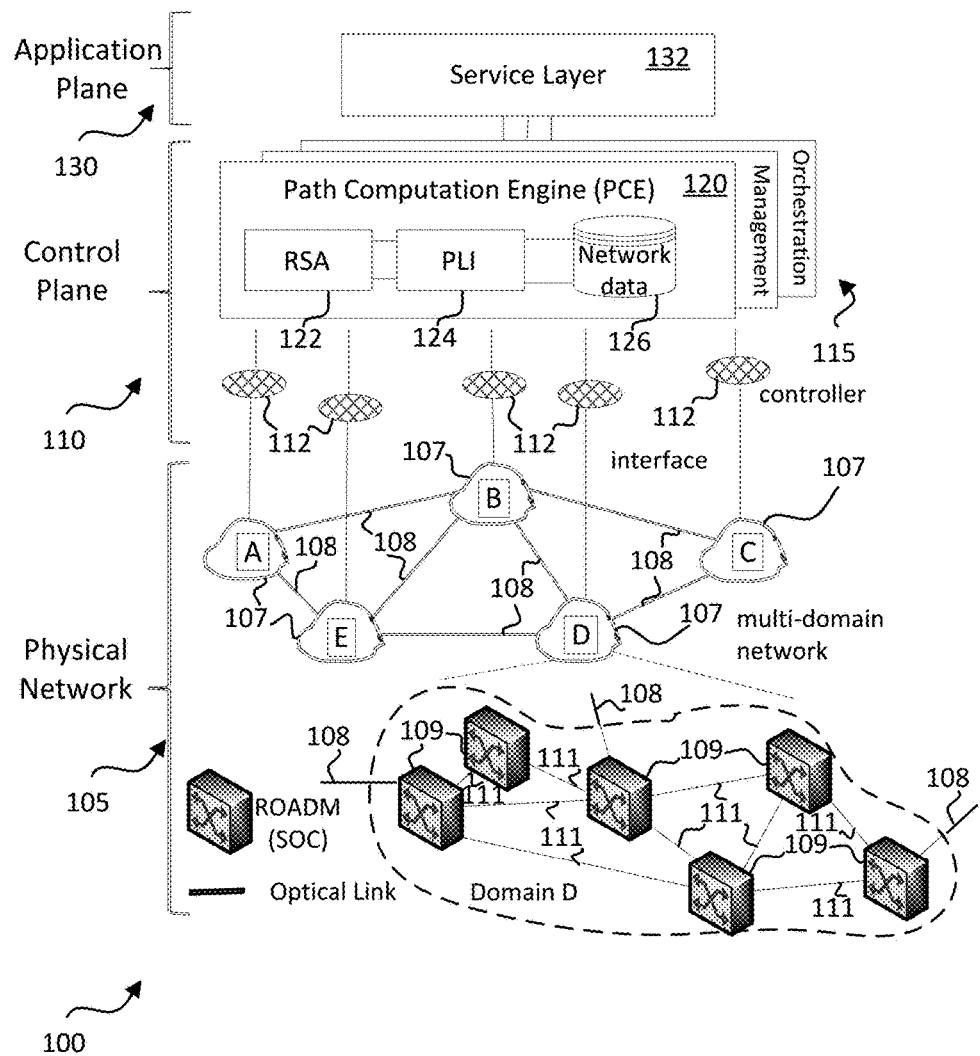
FIG. 1 is an exemplar illustration of a software-defined network with a Physical Layer Impairment aware control plane.

Various acronyms as used herein are defined in the following non-exhaustive list:
DSP: Digital Signal Processing
OSNR: Optical Signal-to-Noise Ratio
PLI: Physical Layer Impairment
RSA: Routing and Spectrum Assignment
SDN: Software-Defined Networking
T-SDN: Transport Software-Defined Networking Referring to FIG. 1, an exemplar illustration of a Transport Software-Defined Network (T-SDN) 100 is presented. The T-SDN 100 is made up of a physical network 105 consisting of a plurality of domains 107 interconnected by optical links 108. Each domain 107 may comprise a domain of a subnetwork of reconfigurable optical add-drop multiplexer (ROADM) heads 109 that provide remote traffic switching functionality to the optical links 111.

A Physical Layer Impairment (PLI) aware control plane 110 controls operation of the physical network 105. T-SDN domain controllers 112 provide control connectivity between a Path Computation Element (PCE) 120 and the domains 107 of the physical network 105. The PCE 120 includes a routing and spectrum assignment (RSA) element 122 (also known as a routing and wavelength assignment (RWA) element) operative to perform RSA operations when assigning network links to a connection to improve network efficiency, resiliency, and to provide for dynamic and reliable connection services. The RSA element 122 is illustrated in communication with a PLI element 124 and a network datastore 126 of the PCE 120.

Above the PLI-aware control plane 110, is the application plane 130 which includes the service layer 132.

A conventional PLI-aware RSA strategy requires large amounts of physical layer data processing to estimate the non-linear effects, as well as their interactions with linear effects, on various links on the network. The computation time complexity is mainly due to the need to numerically solve the nonlinear Schrödinger equation (NLSE) or to resort to other sophisticated models. The results are then used to estimate the physical layer-offered Q factor (equivalently OSNR) for optimal network path and spectrum assignment.

In operation, when a service connection is requested, the RSA element 122 provides a path (or paths) based upon a cost metric. This estimation may be used to calculate the offered Q factor and the Optical Signal-to-Noise Ratio (OSNR) for the network path and wavelength or spectral band selected by the RSA element 122.

As illustrated, T-SDN controllers 112 are operative to query the Sectional Optical Controller (SOC) agents that reside at the ROADM heads 109 within each network domain 107 to obtain OSNR values for each optical link 111 section of the path. In an implementation, the SOC agent is operative to estimate or measure both the linear and non-linear OSNR through communication with amplifiers and reports back the corresponding Q factor for that segment to the corresponding controller 112 in the control plane. The reported Q factor(s) may be used to ensure the path(s) meets the required OSNR. The non-linear calculations using the estimated linear and non-linear OSNR may be performed by the SOC agent, or may be performed by another network element such as the T-SDN controllers 112 or the PCE 120 within PLI 124, using the estimated linear and non-linear OSNR provided by the SOC agents.

The effect of PLI-aware RSA operations on connection time is mainly due to two factors. First, the processing time for the SOC agent(s) to communicate with the ROADM heads 109 to estimate non-linearity, and second the processing time to perform all of the calculations for metric evaluations which are mainly dominated by the non-linear related calculations for each link.

It is noted that for next generation networks, unlike current optical networks, there is an intention to complete and terminate connections dynamically as required to access a service. This operation will lead to a much greater number of connections being formed and terminated within a time period than is currently the case. Furthermore, the next generation networks may provide finer bandwidth granularity, potentially increasing the number of channels. Accordingly, while PLI-aware RSA methods are useful to assist in handling the additional number of connections required in next generation networks, there is a corresponding increase in control complexity such that extensive PLI-aware RSA processing can lead to delays in completing connections while the system waits for network processing resources.

The present application relates to a method for handling connection requests by minimizing the global network processing resources required to provide a PLI-aware RSA network, while still determining a pathing with better network performance than simple fixed routing methods. In an aspect, the present application relates to a method for selecting a RSA scheme having the minimum computational complexity and still achieve a desired network operating level. In an aspect, the present application relates to a method for preferentially selecting network links with no non-linearity and limiting the RSA computations to those non-linear network links. In an aspect, the present application relates to a method for preferentially ordering and selecting network paths based upon an OSNR estimate of component network links, and limiting the RSA computations to those selected network paths. In an aspect, the present application relates to a method for handling connection requests by evaluating whether non-linear computations are necessary to obtain a network path for the connection that meets a pre-determined network performance threshold. In some embodiments, where non-linear computations are determined to be necessary to meet the pre-determined network performance threshold, the method further minimizes the extent of the necessary non-linear computations.

Figure 2:
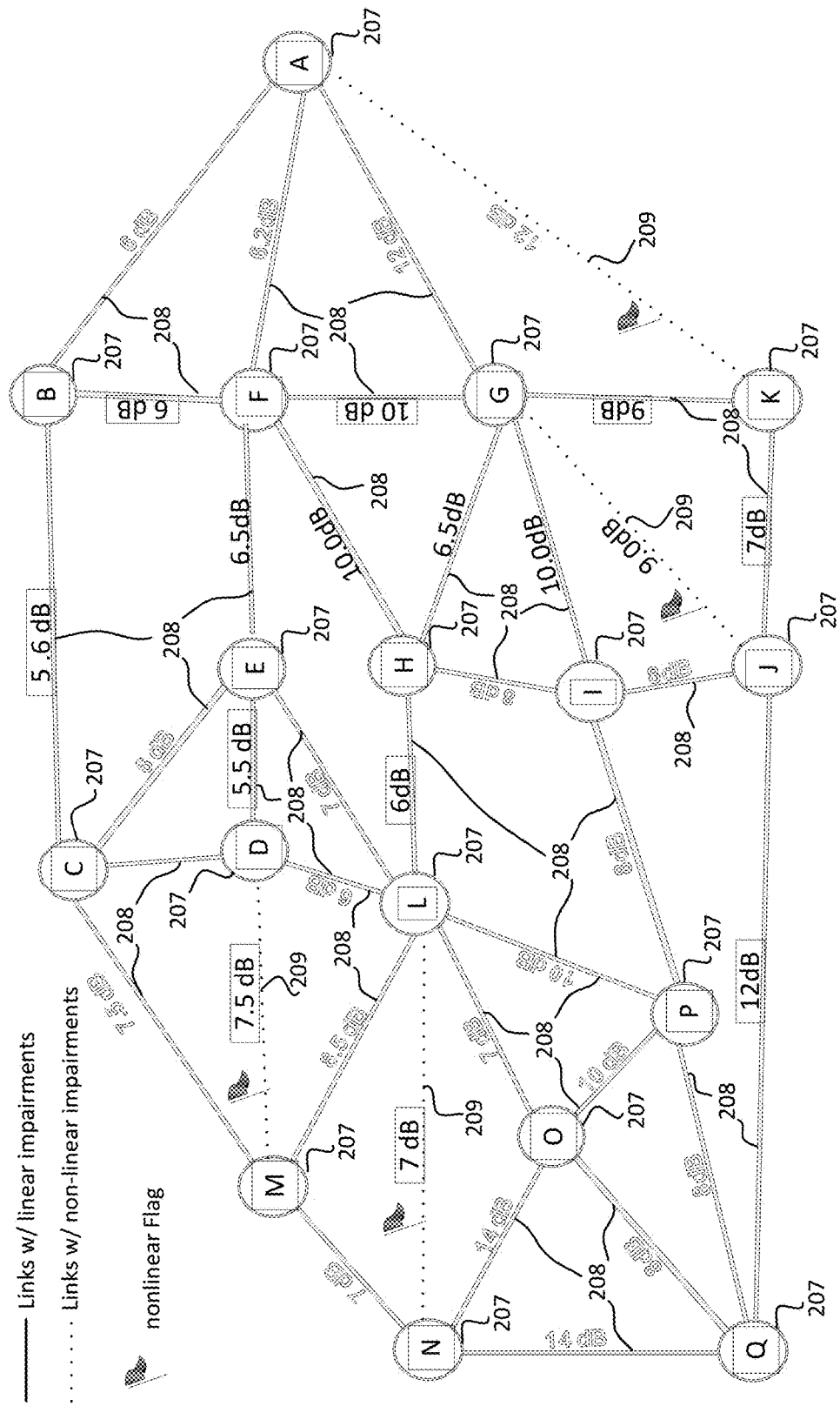
FIG. 2 illustrates an exemplar network.

Referring to FIG. 2 an exemplar network is illustrated to assist in explaining the present system and methods. The network of FIG. 2 includes 17 nodes 207 (identified by the letters A-Q), and is representative of a domain 107 illustrated in FIG. 1. Each node 207 may include a ROADM head 109 and associated SOC agent, also as described in relation to FIG. 1. The nodes 207 are connected by a total of 36 bi-directional optical links 208, 209 which include links experiencing linear impairments, herein referred to as linear links 208, and links experiencing non-linear impairments, herein referred to as non-linear links 209. The non-linear links 209 are indicated in FIG. 2 with dashed lines and non-linear flags. Each link 208, 209 may support a plurality of wavelengths (e.g. 80 wavelengths, for instance).

The network of FIG. 2 is controlled by a T-SDN controller 112. Each SOC agent monitors data from its corresponding link, and calculates linear and non-linear OSNR index values for that link. In some aspects, the SOC agents each maintain a current store of these index values. In some aspects, the SOC agents may periodically send this information as network status update information to the T-SDN controller 112. In some aspects, the SOC agents may be responsive to receive a query from, and send the network status update information to, the T-SDN controller 112. In these aspects, the T-SDN controller 112 may control the periodicity of updates maintained by the RSA element 122.

When a connection request seeking connection between two of the nodes 207 is submitted to the T-SDN controller 112, the RSA element 122 identifies a set of n network paths that can satisfy the request. In one embodiment, the RSA element 122 may maintain a store of OSNR index values assigned to each of the links based upon the network status update information received from the SOC agents. In an aspect, the RSA element 122 may further maintain a table of non-linear OSNR index values (β) and linear OSNR index values for each network link. The index may be used by the RSA element 122 to flag the links that exhibit non-linear degradation or impairment over a non-linear threshold level, as illustrated in FIG. 2.

In another embodiment, the SOC agent only measures linear OSNR and, based on monitored power measurement from the link, the SOC agent determines an indicator for non-linearity (i.e. a non-linear index β or non-linearity flag). The non-linearity indicator may be used to indicate whether or not a non-linear calculation is determined to be necessary given current network conditions. As indicated above, the non-linear calculations may be completed by one or more elements within the T-SDN 100. In some aspects elements in the control plane, such as the PLI element 124, may be equipped with the necessary functions and modules to perform the non-linear calculations. In some aspects elements outside the control plane, such as the SOC agent may perform the non-linear calculations.

In an embodiment, the method may provide for determining whether a non-linear calculation is needed to provide increased performance based upon a network utilization parameter. The network utilization parameter sets at least one utilization threshold for at least one network utilization metric of links of the network. In some aspects, the network utilization parameter may comprise a global metric for the network. In some aspects, the network utilization parameter may comprise a plurality of metrics, each corresponding to a particular combination of links that form a network path between two nodes connected to the network. In some aspects, the network utilization parameter may comprise a plurality of metrics each corresponding to an individual link of the network.

In some aspects, the network utilization parameter value may comprise a network load factor, a network congestion metric, and/or a network blocking probability factor. The network utilization parameter may define at least one utilization threshold against which to evaluate characteristics or metrics of each link of the network, combination of links, or the network as a whole, as may be applicable. In an aspect, the network utilization parameter may provide a minimum utilization threshold level. The minimum utilization threshold level may define a level of network utilization below which network path assignment may efficiently be conducted without non-linear calculations. The minimum utilization threshold level may further define a level of network utilization above which network path assignment may efficiently be conducted by including non-linear calculations. In some aspects, the network utilization parameter may provide a maximum utilization threshold level. The maximum utilization threshold level defining a level of network utilization above which network path assignment may efficiently be conducted without non-linear calculations.

In an aspect, the network utilization parameter for each link may be selected or computed based on such parameters as a network load, network congestion, and/or network blocking probability applicable to that link of the network.

In the embodiment, the method may include determining the network utilization parameter, and carrying out method steps depending upon the determined network utilization parameter value being above or below one or more threshold values.

In an embodiment, the method may provide for load balancing the network links by selecting the least number of wavelengths utilized among the network paths selected by the routing algorithm. In an implementation, an alternate routing with load balancing may be utilized. In the implementation, available network paths are identified that a) connect two nodes; and, b) each path meets a minimum route OSNR threshold. From the set of available network paths, a subset of network paths may be identified, where each of the network paths in the subset utilize less than a threshold number of wavelengths (i.e. less than a "number of wavelengths threshold"). In some aspects, a further secondary discriminant may be applied to select a network path from the subset of identified network paths.

In some aspects, the subset of identified network paths may be identified based on paths that use a minimum number of wavelengths (i.e. the one or more network paths within the set of available paths that utilize the minimum number of wavelengths). In these aspects, the number of wavelengths threshold is the minimum number of wavelengths utilized by any of the available network paths.

In some aspects, the subset of identified network paths may be identified based on paths that exclude non-linear links. A network path assignment operation may then proceed on the identified sub-set of network paths without any non-linear calculations. For instance, the network path with the highest linear OSNR may be selected.

The secondary discriminant may be, for instance, a length of candidate paths, and the shortest path will be selected. In other aspects, the secondary discriminant may comprise an OSNR of the paths, and the path with the highest OSNR will be selected. In other aspects, a congestion metric may be applied, and the path with the lowest network congestion, or that preferentially excludes links with higher network congestion (i.e. includes links with lower network congestion), may be selected. In some aspects, a specific link may be identified, e.g. a link identified based on the presence of non-linearity, a threshold congestion level or a threshold OSNR level, and the path that excludes or includes such links may be selected. By way of example, in an aspect the method may include identifying network paths that exclude, or have a minimum n umber of, non-linear links; and, assigning the network path from the identified network paths above the threshold OSNR. In some aspects, the network path with the highest linear OSNR may be selected.

In some aspects, a combination of these discriminants may be applied. In some of these aspects, a network path is assigned from the identified sub-set of network paths based on the highest combination of linear OSNR and non-linear OSNR.

In an implementation, a method may be provided for carrying out alternate routing with load balancing. Generally, n available network paths may first be determined that connect two nodes of the network. For instance, the method may include the steps of:
1) for each path (consisting of a plurality of links) of the n paths, determine the sum of utilized wavelengths by summing the wavelengths utilized by each link of that path;
2) identify q paths from the set of n paths by evaluating the sum of utilized wavelengths for each of the n paths, and identifying those paths that meet the number of wavelengths threshold; and optionally,
3) if more than one path has the same sum of utilized wavelengths, apply a secondary discriminant.

Which wavelength is selected (among available wavelengths) on that path, could be based on conventional wavelength assignment algorithms such as random, first fit or most used schemes as are known in the art.

In the above method, in some aspects the number of wavelengths threshold may be a variable threshold that selects the minimum number of wavelengths available for a given set of q paths. There may be more than one network path that utilizes the minimum number of wavelengths. In other aspects, the number of wavelengths threshold is a fixed number, with the expectation that use of a secondary discriminant will generally be required.

In an implementation, load balancing in the above context can be applied to k-shortest path, in which k paths are selected that are shortest, but among these k paths, the path that has a minimum sum of utilized wavelengths on its links is selected to achieve load-balancing of the utilized wavelengths.

In an embodiment, the methods described within this application may be combined. For instance, from the n paths (out of all possible paths) a path may be selected that is (a) a shortest path; (b) meets the required OSNR levels (linear and non-linear); and, (c) meets the number of wavelengths threshold. This embodiment thus comprises a combination of k-shortest path with load balancing and with selective non-linear OSNR calculations. In the embodiment, the q paths may be selected from a subset of the n paths, such as the p paths identified based on OSNR.

When non-linear calculation is deemed to be needed to improve network performance, the method may include a routing method that includes both a linear OSNR calculation and the non-linearity indicator (such as the non-linear index value $\beta$, or direct measurements/comparisons made by the SOC). In an aspect, the SOC performs linear OSNR calculation and flags the links with non-linearity based on its measurements.

In an aspect, upon receipt of a connection request, the RSA element 122 obtains the linear OSNR and non-linearity indicator from the SOC(s) for each of the network links. Then, based on the linear OSNR, the RSA element 122 finds n network paths which satisfy the starting point and end point requirements. Based on the non-linear indicator for each network path of the n network paths and the linear OSNR values, the method can selectively perform a minimum amount of non-linear calculations.

In an aspect, RSA element 122 may maintain a table of non-linearity indicators, each corresponding to a one of the network links and distinguishing between linear links 208 and non-linear links 209. In an aspect, the indicators may each comprise a normalized value corresponding to a non-linearity measure for that network link. In an aspect, the table may be updated periodically by the RSA element 122 via the domain controllers 112. In an aspect, the table may be updated on a per-session query by the RSA element 122 to the SOC agents 109 via the domain controller elements 112. In an aspect, the table may be updated by a combination of periodic updates and per-session queries submitted by the RSA element 122 to the SOC agents.

In an implementation, each SOC agent may maintain its own local table of non-linear indicators, such as non-linear OSNR index values ($\beta$), and linear OSNR index values for its network link. The SOC agent(s) may update the RSA element 122 by forwarding a current set of non-linear indicators and linear OSNR index values in response to a query, or based upon a periodic update schedule. In an implementation with every routing request all linear OSNR values and non-linear indicators are pulled by the RSA element 122 from the SOC agent(s) to use in the methods described herein. The non-linear OSNR index values ($\beta$) may conveniently be normalized, i.e. $0 \leq \beta \leq 1$, and a non-linear threshold value $\beta_{thresh}$ may be defined for the T-SDN 100. The SOC agents, and/or the RSA 122 may be operative to flag a link as being non-linear when the estimated or measured non-linear index value $\beta$ meets or exceeds $\beta_{thresh}$.

Figure 3:
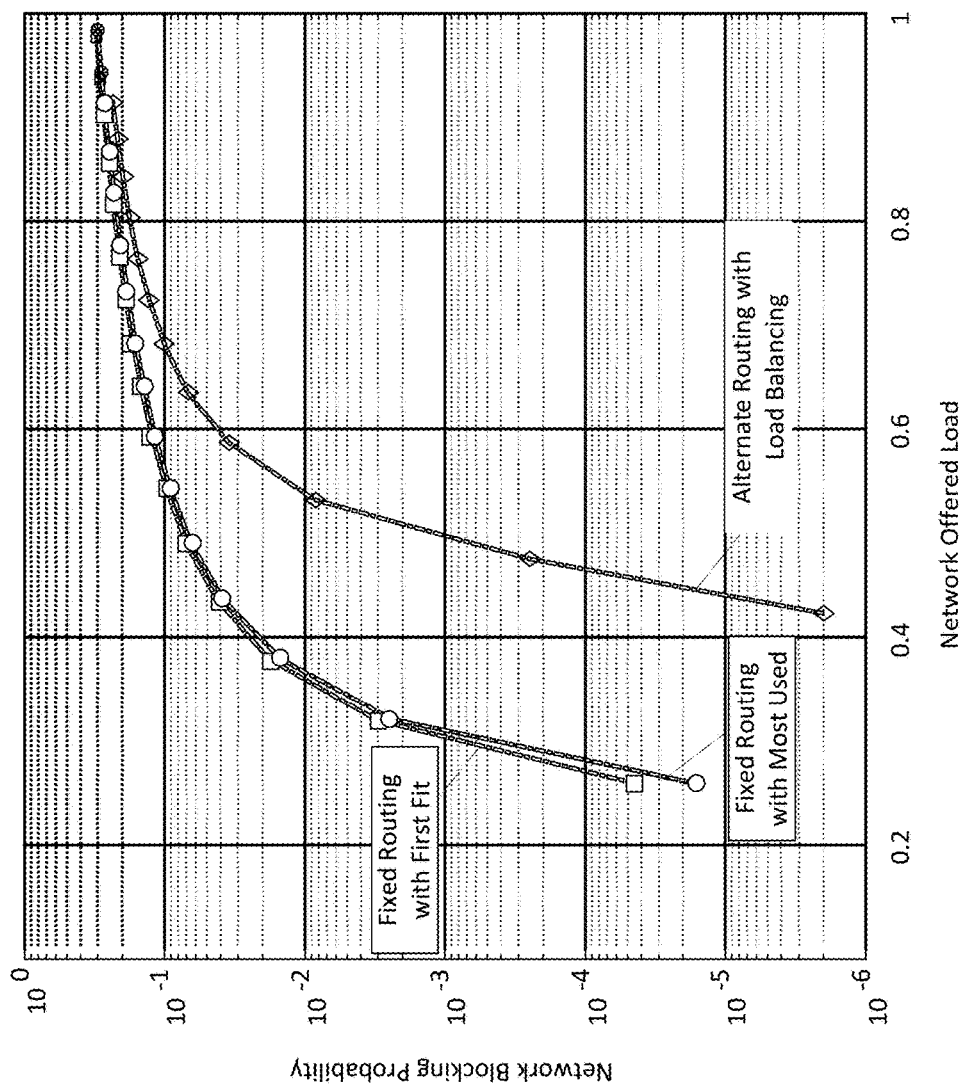
FIG. 3 is an exemplar plot illustrating relative blocking performance between different routing schemes.

In a first embodiment, the present application relates to a system and method for routing scheme selection to minimize RSA calculations across a range of network conditions. Referring to FIG. 3, fixed routing RSA schemes (first fit and best fit) are compared with a more complex method of alternate routing with load balancing. As indicated in the figure, the alternate routing with load balancing provides a lower network blocking probability across a range of network offered loads. Alternate routing methods provide for the selection of a path from n available paths. In the present case, the embodiment further provides for load balancing wavelength assignment across all links of the selected path.

Figure 4:
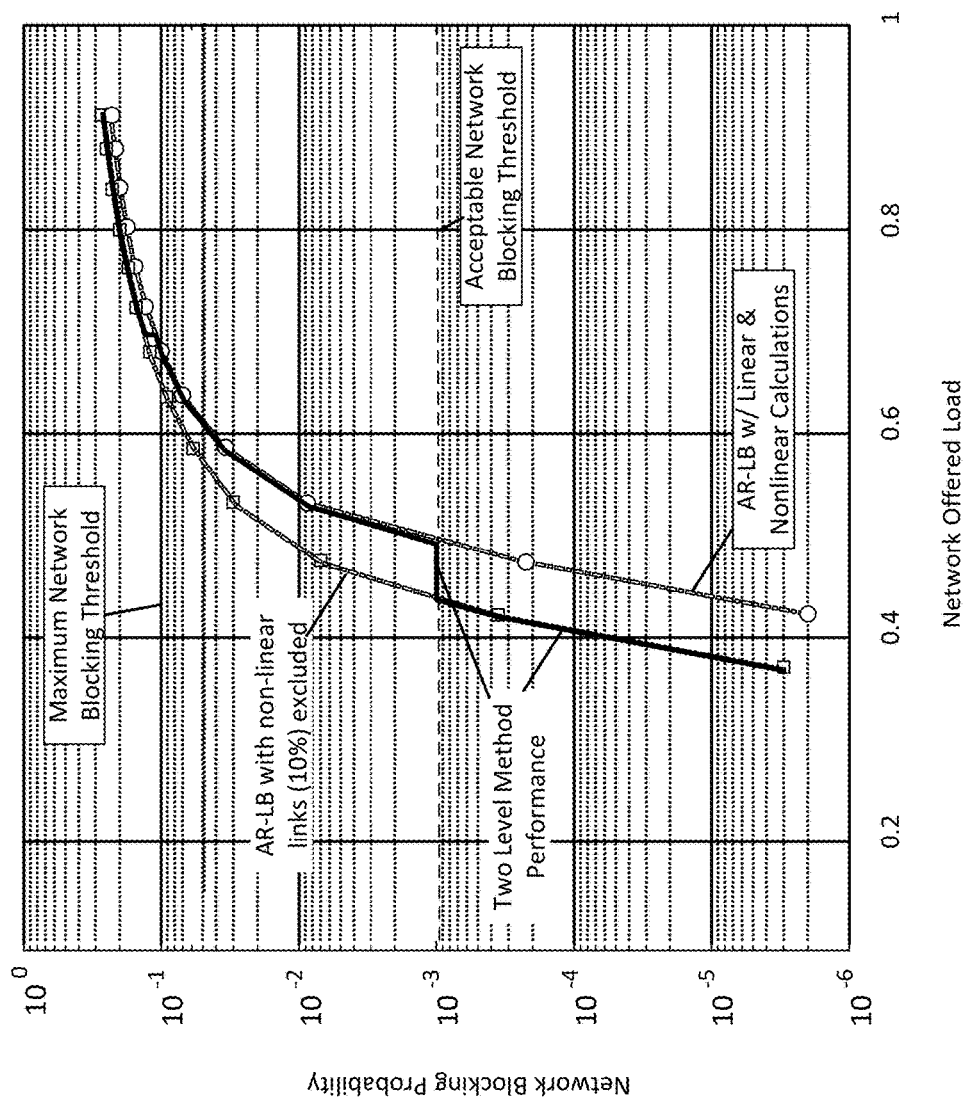
FIG. 4 is an exemplar plot illustrating blocking performance of an embodiment of the present invention.

In a second embodiment, the present application relates to a system and method for routing scheme selection to minimize RSA calculations across a range of network conditions. Referring to FIG. 4, in the second embodiment, the inventors have discovered that a considerable reduction in network resources may be obtained and still use the alternate routing with load balancing method where it is most effective. In particular, at low network loads most of the links have only linear effects. Accordingly, in an aspect the RSA element 122 can simplify the calculation by rejecting all network paths that include network links with flagged non-linear effects, for instance by evaluating the non-linear indicators corresponding to each network link of the available network paths. In this case the RSA calculations will only be linear calculations since only the linear network paths have been selected for inclusion. This method has its limits, however, in that selecting only linear links will lead to higher blocking probability for a given network load. At higher network loads the cost of excluding non-linear links, in blocking probability, will be high. In a next step the method provides for switching routing selection schemes to include non-linear links when the network load reaches a level where the blocking probability reaches an acceptable network blocking threshold. In an aspect, the method may further include again excluding non-linear links from routing for high load network conditions. As illustrated in FIG. 4, at high network offered load, there is little distinction between route selection schemes in terms of resulting network blocking probability. As a result, there is little value gained in including non-linear links in network path calculation as there is limited impact on blocking performance.

The second embodiment thus involves selecting the lower cost RSA scheme (excluding network paths with non-linear network links) until the network load is such that the acceptable network blocking threshold is reached ($10^{-3}$ is used for illustrative purposes in FIG. 4). In the example of FIG. 4, the network blocking probability threshold is illustrated as occurring at around the network offered load of 0.42 using the simplified method of excluding non-linear links. As will be appreciated, in practice other levels will be applicable depending upon network and requirements. At the network blocking threshold, the higher cost RSA scheme (including network paths with non-linear network links) leads to a lower blocking probability for a given network load, and accordingly is worth the additional computational cost. In an aspect, non-linear calculations can further be reduced by switching back to excluding network paths with non-linear network links at a maximum network blocking threshold ($10^{-1}$ in the example of FIG. 4). Above the maximum network blocking threshold the probability of blocking is similar for both methods, and accordingly the additional computational cost of including non-linear links is not balanced by a resulting improved network blocking performance.

In third embodiment, the present application provides for reducing the number of non-linear calculations made when the network load is between the acceptable network blocking threshold and the maximum network blocking threshold. In the implementation, the RSA element 122 uses the stored values to complete a coarse calculation of potential network paths using all, or most, of the available network links to identify a preferred pathing through the network between nodes. The coarse calculation comprising a linear calculation completed on a plurality of network links.

In an aspect, the present application provides for a utilizing at least one of the first, second and third embodiments. In an aspect, the present application provides for utilizing a combination of at least two of the first, second and third embodiments.

After completing the coarse calculation, the RSA element 122 may identify a subset of network paths from the coarse calculation that exhibit acceptable OSNR values. The subset of network paths providing a subset of the plurality of network links.

The RSA element 122 may then query the corresponding SOC agents for each of the network links corresponding to the subset of network paths to obtain updated current non-linear OSNR index values ($\beta$) and linear OSNR index values. The RSA element 122 may then perform a fine calculation based upon the updated non-linear index values ($\beta$) and linear OSNR index values for the subset of network links. The fine calculation comprising a linear and non-linear calculation on the subset of network links.

In an aspect, the RSA element 122 may be operative to sort available network paths to preferentially select network paths having a minimum number of non-linear links. In some aspects, the selection process may include rank sorting a set of network paths based on an identified discriminant. A network path, or a sub-set of network paths, may then be identified for further evaluation from the rank sorted set of network paths. In some aspects, the further evaluation may comprise selecting the network path with the highest, or lowest, identified discriminant. In some aspects, the further evaluation may comprise selecting the network path, or network paths, with an identified discriminant above, or below, a specified threshold level. In some aspects, the identified discriminant comprises an OSNR.

Figure 7A:
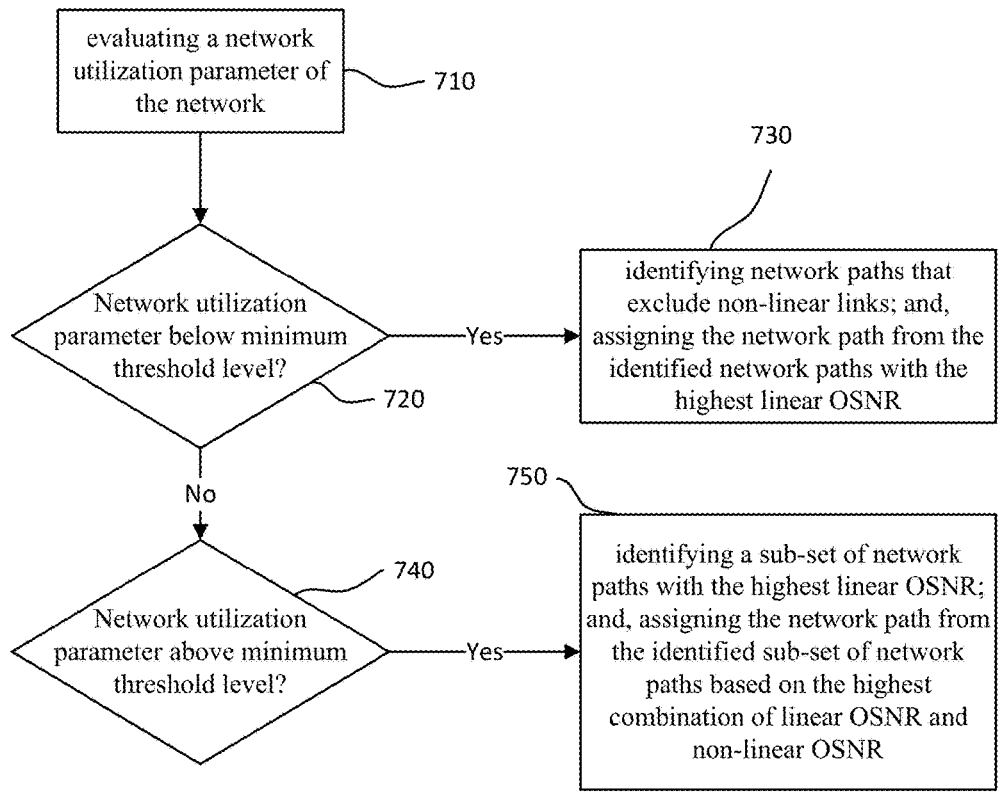
FIG. 7a is a process flow diagram illustrating an embodiment of network path assignment using a single network utilization threshold.

Referring to FIG. 7a, in an aspect, in response to a connection service request the RSA element 122 may perform the following steps to assign a network path, from an available set of n network paths, to connect a first node and a second node of a network:

i. In step 710, evaluating a network utilization parameter of the network;

ii. In step 720, if the network utilization parameter is below a minimum utilization threshold level, then execute step 730 identifying network paths that exclude non-linear links; and, assigning the network path from the identified network paths with the highest linear OSNR; and, iii. In step 740, if the network utilization parameter is above the minimum utilization threshold level, then execute step 750 identifying a sub-set of network paths with the highest linear OSNR; and, assigning the network path from the identified sub-set of network paths based on the highest combination of linear OSNR and non-linear OSNR.

Figure 7B:
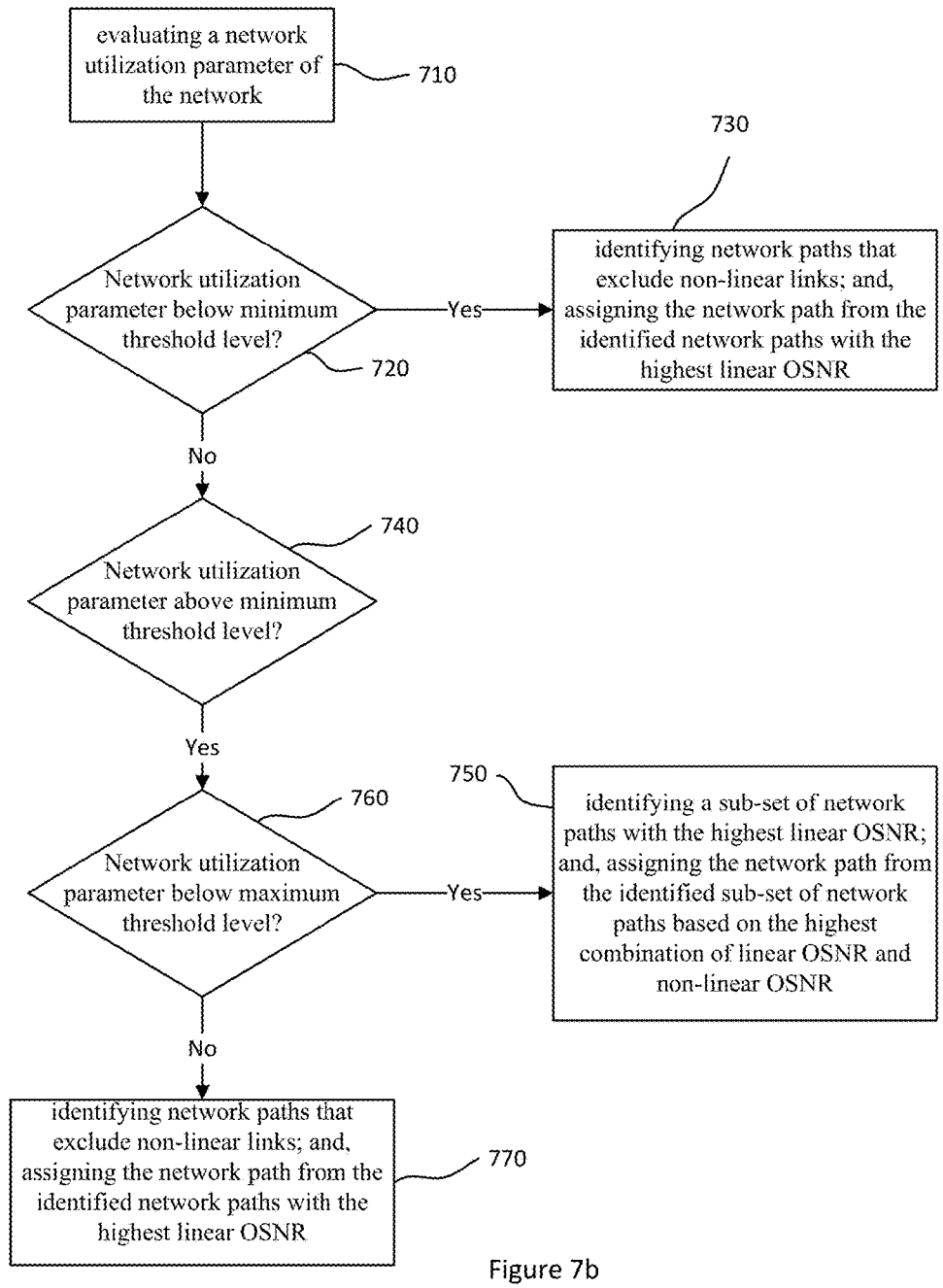
FIG. 7b is a process flow diagram illustrating an embodiment of network path assignment using two network utilization thresholds.

FIG. 7b is an alternate embodiment that includes an additional test in step 760 to determine whether the network utilization parameter is below a maximum threshold level. If the network utilization parameter is below the maximum threshold level, step 750 is executed identifying a sub-set of network paths with the highest linear OSNR; and, assigning the network path from the identified sub-set of network paths based on the highest combination of linear OSNR and non-linear OSNR. If the network utilization parameter is above the maximum threshold level, step 770 is executed identifying network paths that exclude non-linear links and, assigning the network path from the identified network paths with the highest linear OSNR.

Figure 8:
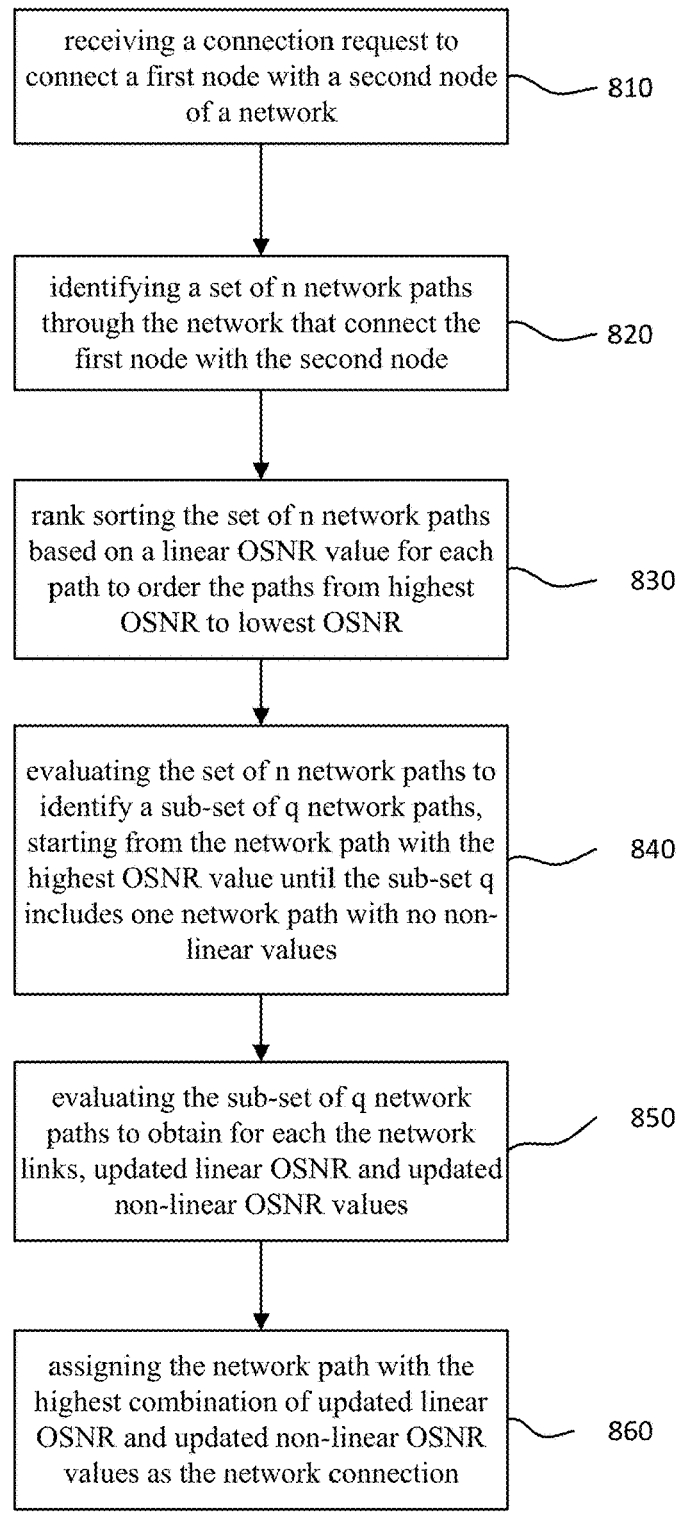
FIG. 8 is a process flow diagram illustrating an embodiment of a network path assignment option.

Referring to FIG. 8. in an aspect, the RSA element 122 may assign a network connection by performing the following steps:

i. Step 810, receiving a connection request to connect a first node with a second node of a network;

ii. Step 820, identifying a set of n network paths through the network that connect the first node with the second node;

iii. Step 830, rank sorting the set of n network paths based on a linear OSNR value for each path to order the paths from highest OSNR to lowest OSNR;

iv. Step 840, evaluating the set of n network paths to identify a sub-set of q network paths, starting from the network path with the highest OSNR value until the sub-set q includes one network path with no non-linear values;

v. Step 850, evaluating the sub-set of q network paths to obtain for each the network links, updated linear OSNR and updated non-linear OSNR values; and, vi. Step 860, assigning the network path with the highest combination of updated linear OSNR and updated non-linear OSNR values as the network connection.

Figure 9:
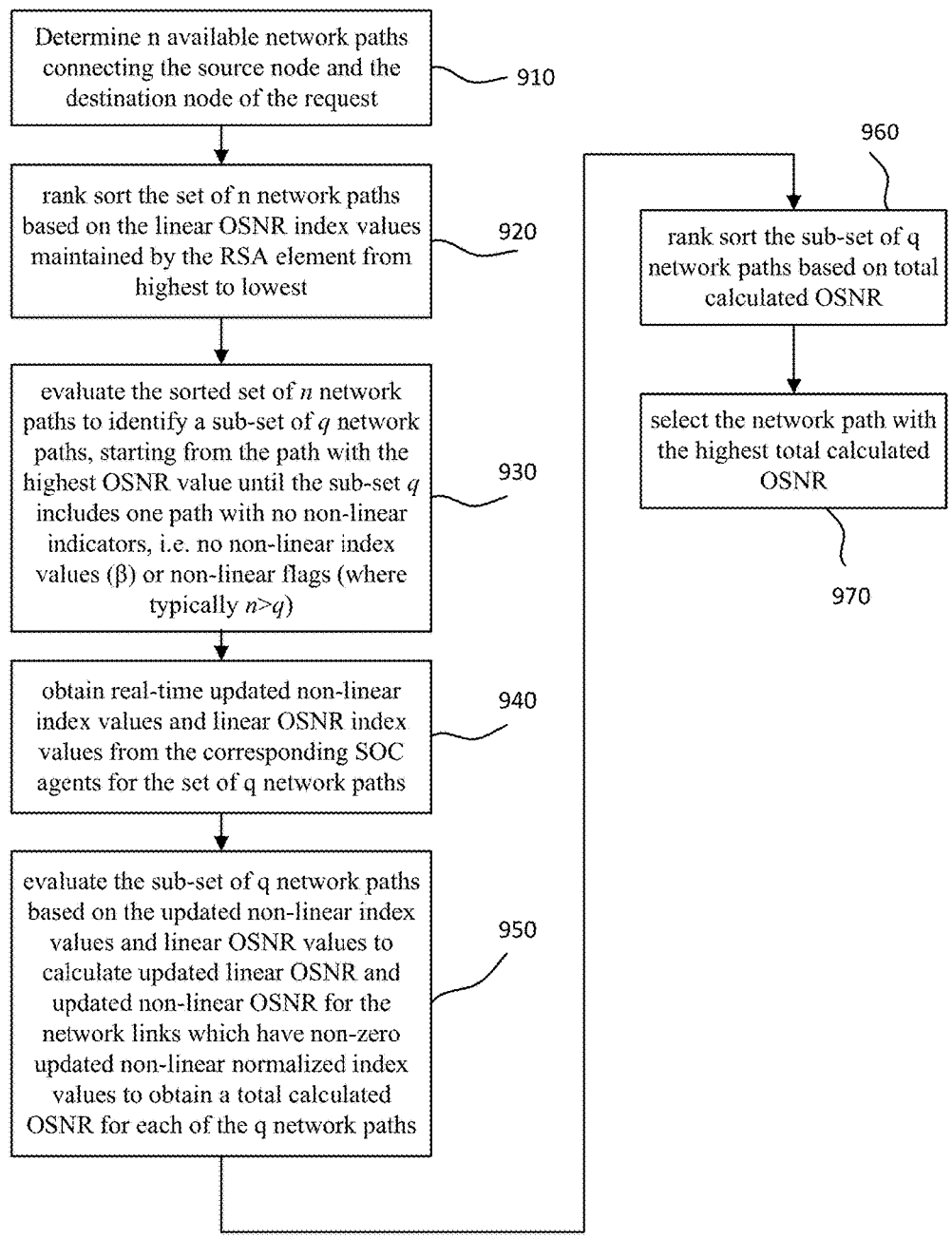
FIG. 9 is a process flow diagram illustrating an embodiment a network path assignment option using real-time non-linear index values.

Referring to FIG. 9, in an aspect, in response to a connection service request the RSA element 122 may perform the following steps:

i. Step 910, determine n available network paths connecting the source node and the destination node of the request;

ii. Step 920, rank sort the set of n network paths based on the linear OSNR index values maintained by the RSA element from highest to lowest;

iii. Step 930, evaluate the sorted set of n network paths to identify a sub-set of q network paths, starting from the path with the highest OSNR value until the sub-set q includes one path with no non-linear indicators, i.e. no non-linear index values ($\beta$) or non-linear flags (where typically n>q);

iv. Step 940, obtain real-time updated non-linear index values ($\beta$) and linear OSNR index values from the corresponding SOC agents for the set of q network paths;

v. Step 950, evaluate the sub-set of q network paths based on the updated non-linear index values ($\beta$) and linear OSNR values to calculate updated linear OSNR and updated non-linear OSNR for the network links which have non-zero updated non-linear normalized index values ($\beta$) to obtain a total calculated OSNR for each of the q network paths;

vi. Step 960, rank sort the sub-set of q network paths based on total calculated OSNR; and, vii. Step 970, select the network path with the highest total calculated OSNR.

Figure 10:
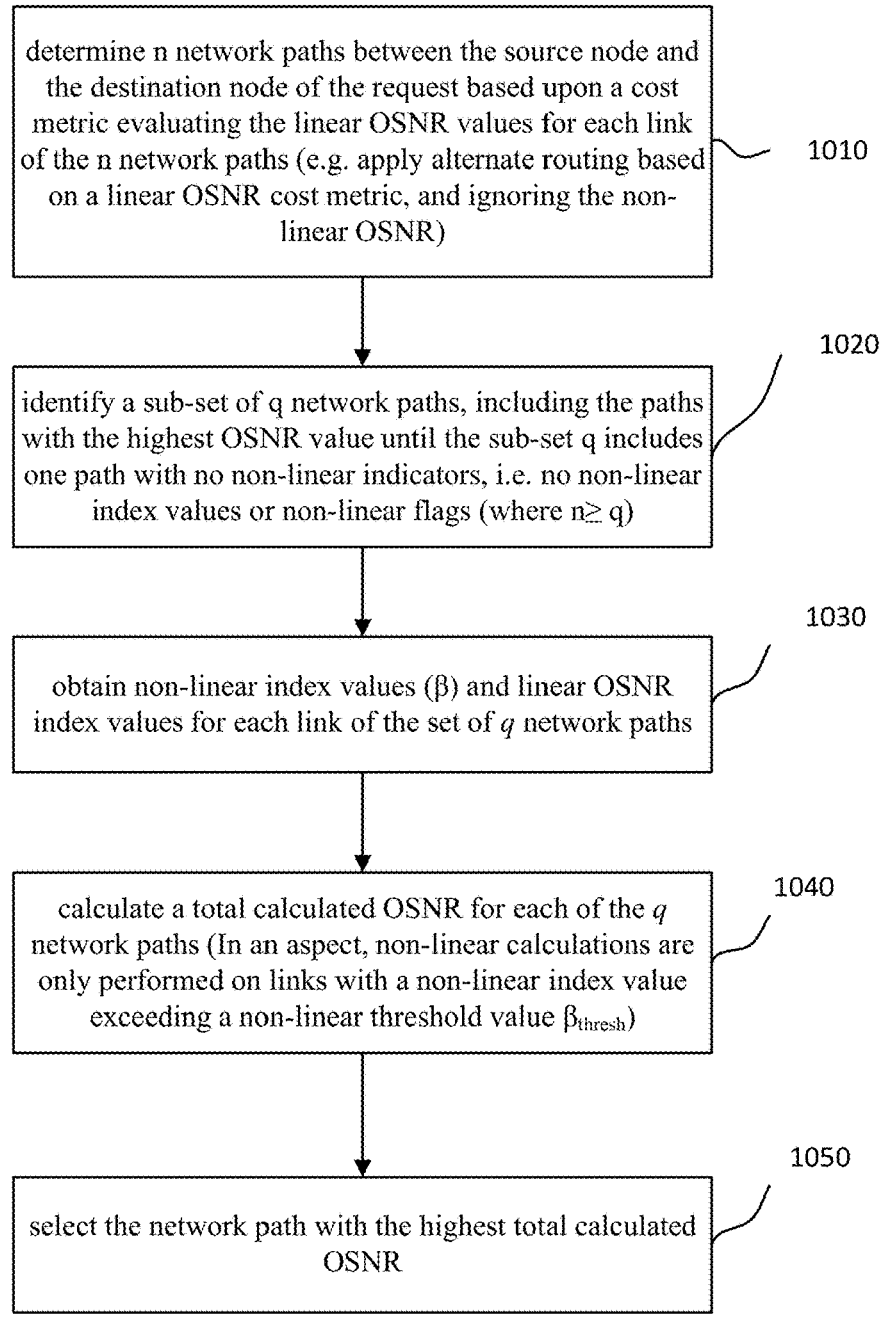
FIG. 10 is a process flow diagram illustrating an embodiment of a network path assignment option.

Referring to FIG. 10, in an aspect, in response to a connection service request the RSA element 122 may perform the following steps:

i. Step 1010, determine n network paths between the source node and the destination node of the request based upon a cost metric evaluating the linear OSNR values for each link of the n network paths (e.g. apply alternate routing based on a linear OSNR cost metric, and ignoring the non-linear OSNR);

ii. Step 1020, identify a sub-set of q network paths, including the paths with the highest OSNR value until the sub-set q includes one path with no non-linear indicators, i.e. no non-linear index values ($\beta$) or non-linear flags (where n≥q);

iii. Step 1030, obtain non-linear index values ($\beta$) and linear OSNR index values for each link of the set of q network paths;

iv. Step 1040, calculate a total calculated OSNR for each of the q network paths (In an aspect, non-linear calculations are only performed on links with a non-linear index value exceeding a non-linear threshold value $\beta_{thresh}$); and, v. Step 1050, select the network path with the highest total calculated OSNR.

Unlike prior art path selection methods, which apply linear and non-linear calculations to the complete set of n available (or "possible") paths, the present methods selectively apply non-linear calculations to a reduced set of paths, reducing the number of non-linear calculations required to make the path selection.

Figure 5:
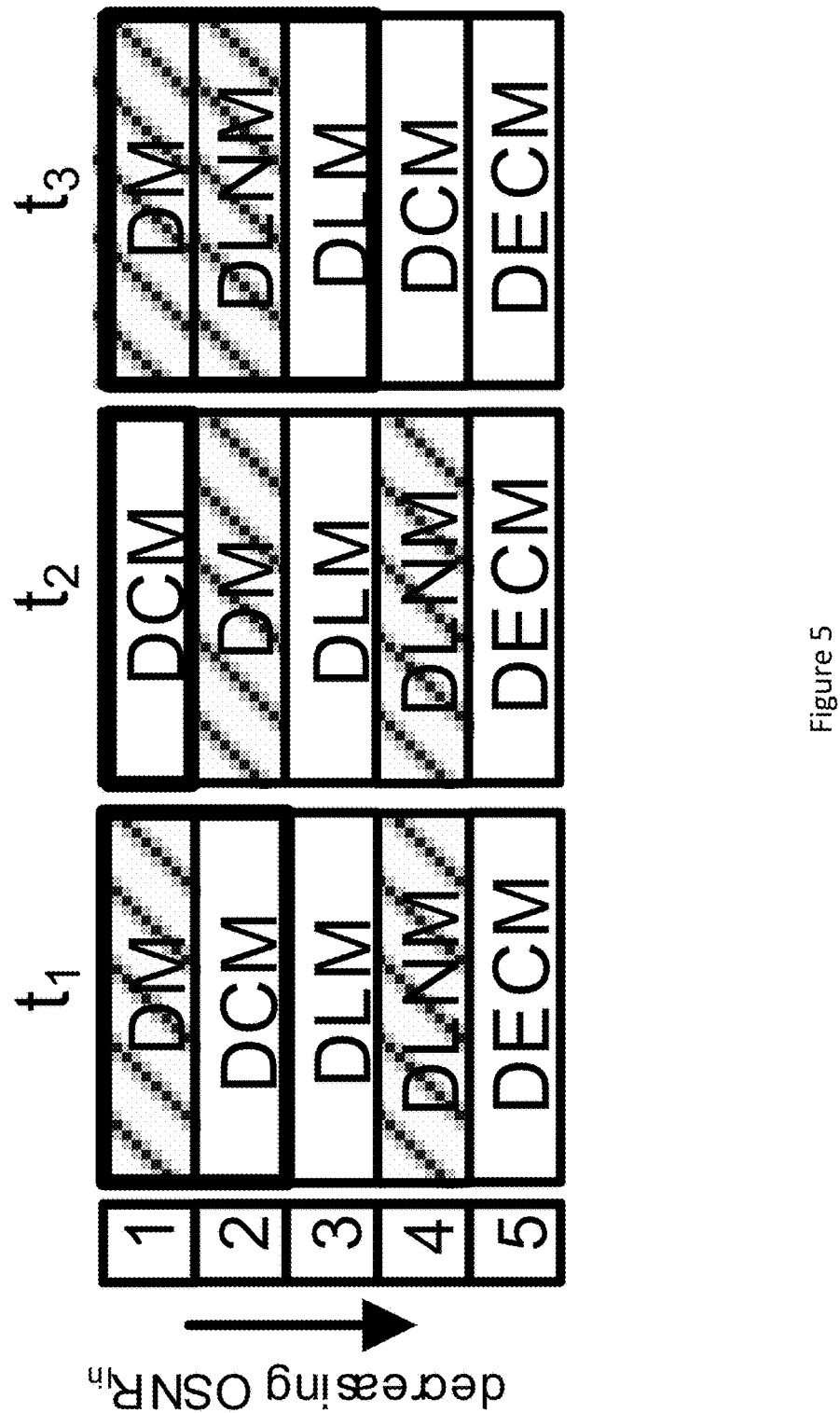
FIG. 5 is a table illustrating an example of ordering network links based on OSNR at different time points.

Referring to FIG. 5 with further reference to FIG. 2, an example is shown of the result of three connection requests made between a source D and destination M (FIG. 2) that were made at different times $t_1$, $t_2$ and $t_3$, each with different network (OSNR) conditions. The table entries in FIG. 5 denote various alternative paths between the nodes D and M, e.g. DCM denotes a path from the node D to the node C to the node M (FIG. 2). Assuming n=5, the network paths were initially sorted by the RSA element 122 based on the current index values to identify the q network paths to include one path with no non-linear ($\beta$) values. In this example, q is two, one and three for the connection requests made at times $t_1$, $t_2$ and $t_3$, respectively. This means that for case 1 at time $t_1$, there is one non-linear calculation (DM), while for case 2 at $t_2$ and case 3 at $t_3$, there are zero and two (DM, DLNM) non-linear calculations, respectively. Accordingly, while the traditional method would require 2 non-linear calculations to satisfy each connection request, the example of the present implementation provides a selected network path while performing, 1, 0, and 2 non-linear calculations. Overall, the present implementation provides for fewer non-linear calculations over conventional methods, while still providing increased performance over fixed routing methods.

Figure 6:
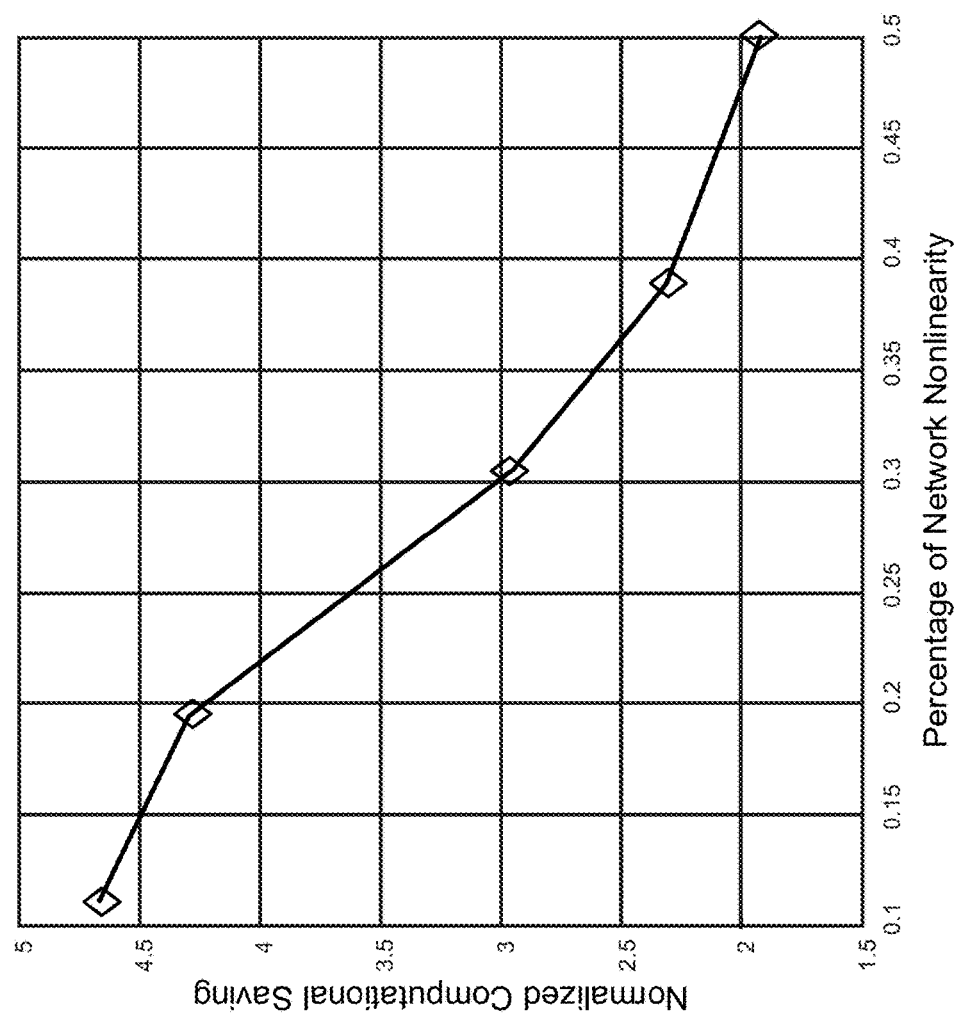
FIG. 6 is an exemplar plot illustrating computational savings vs. network nonlinearity.

In an experiment, the network of FIG. 2 was simulated, with Poisson arrival for connection requests and exponential distribution for connection hold time, the non-linear link component was varied in a range from 10% to 50%. Referring to FIG. 6, a plot of normalized computational saving over traditional methods vs. percentage of network non-linearity was computed using the experimental simulation. As illustrated, the computational saving is greatest where there is a relatively low percentage of network non-linearity. In these cases, the present method avoids unnecessary non-linear calculations, as illustrated in the FIG. 5 example, whereas the traditional methods include all of the non-linear calculations. Accordingly, in the experimental simulation a computational savings of a ~2× was found for networks having less than 50% of the network links being flagged for non-linearity.

In an implementation, a method is provided for a network routing and spectrum assignment (RSA) element of a Path Computation Element (PCE) to provide physical layer impairment (PLI) aware network path assignment on a communication network. The RSA element may assign a network path, from an available set of n network paths, to connect a first node and a second node of a network. In some aspects, the method may be triggered by the RSA element receiving a connection request to connect a first node with a second node of the network. The method may include evaluating a network utilization parameter of the network. In some aspects, the network utilization parameter is based on at least one of: a network blocking probability; a network load; and, a network congestion metric. If the network utilization parameter is below a minimum utilization threshold level, the network path assignment may avoid non-linear calculations. For instance, the method may include identifying network paths that exclude non-linear links and assigning the network path from the identified network paths with the highest linear OSNR. Alternatively, if the network utilization parameter is above the minimum utilization threshold level, the network path assignment may include non-linear calculations to better select a suitable network path assignment. In some aspects, the network path assignment may selectively identify a sub-set of available network paths based on a linear evaluation, and then perform the non-linear calculations on the identified sub-set of network paths. For instance, the method may include identifying a sub-set of network paths with the highest linear OSNR and assigning the network path from the identified sub-set of network paths based on the highest combination of linear OSNR and non-linear OSNR.

In an implementation, if the network utilization parameter is above the minimum utilization threshold level and above a maximum utilization threshold load level, the network path assignment method may avoid non-linear calculations. For instance, if the network load is above the maximum utilization threshold load level the method may include identifying network paths that exclude non-linear links and assigning the network path from the identified network paths with the highest linear OSNR.

In an implementation, if the network utilization parameter is above the minimum utilization threshold level, and a non-linear calculation is to be performed, the sub-set of network paths are identified by: performing network path and spectrum assignment operations on the set of n network paths to generate, for each network path a corresponding linear OSNR value and a non-linearity indicator indicating a level of non-linearity along that network path; rank sorting the n network paths based on the corresponding linear OSNR values; and, including highest ranked network paths and only one network path having a corresponding non-linearity indicator indicating the level of non-linearity along that network path is below a non-linear threshold level.

In an implementation, if the network utilization parameter is below the minimum utilization threshold level, the linear path selection comprises the RSA element: identifying a set of n network paths through the network that connect the first node with the second node and are absent non-linear links, selecting p network paths from the set of n network paths that have the highest linear OSNR levels, and, selecting a network path from the sub-set of p network paths that balances the wavelength utilization between the first node and the second node of the network.

In order to identifying network paths that exclude non-linear links, the method may include selecting a sub-set of p network paths from the set of n network paths that have no non-linear links, performing a linear network path and spectrum assignment operation on the sub-set of p network paths to generate a corresponding set of OSNR values, and, assigning the network path having a corresponding highest linear OSNR value from the sub-set of p network paths.

In an embodiment, a method is provided for assigning a network connection. A network routing and spectrum assignment entity (i.e. a RSA element) may carry out the following steps: receiving a connection request to connect a first node with a second node of a network; identifying a set of n network paths through the network that connect the first node with the second node; rank sorting the set of n network paths based on a linear OSNR value for each path to order the paths from highest OSNR to lowest OSNR; evaluating the set of n network paths to identify a sub-set of q network paths, starting from the network path with the highest OSNR value until the sub-set q includes one network path with no non-linear values; evaluating the sub-set of q network paths to obtain for each the network links, updated linear OSNR and updated non-linear OSNR values; and, assigning the network path with the highest combination of updated linear OSNR and updated non-linear OSNR values as the network connection.

In some aspects, the evaluating the sub-set of q network paths to obtain, for each the network links, updated linear OSNR and updated non-linear OSNR values may include evaluating, for each link of the q network paths, the updated non-linear OSNR value for that link, and performing non-linear OSNR calculations on that link if the updated non-linear OSNR value is over an OSNR threshold level.

In an implementation, a method is provided for a network control entity to assign a network path between a first node and a second node of a network, the method may include the control entity: identifying a set of n network paths through the network that connect the first node with the second node and are absent non-linear links, performing route selection by selecting a sub-set of p network paths from the set of n network paths that have the best linear OSNR, and, selecting a network path from the sub-set of p network paths that meets a number of wavelengths threshold and assigning the selected network path.

In some aspects, before the control entity identifies the set of n network paths, the method may include the control entity: evaluating a network utilization parameter of the network, wherein if the network parameter is below a minimum threshold level, the route selection comprises selecting the sub-set of p network paths from the set of n network paths that have no non-linear links, and the assignment comprises performing a linear path and wavelength assignment operation on the sub-set of p network paths to generate a corresponding set of OSNR values and assigning the network path having a corresponding highest linear OSNR value.

In some aspects, before the control entity identifies the set of n network paths, the method may include the control entity: evaluating a network utilization parameter of the network, wherein if the network parameter is above a maximum threshold level, the route selection comprises selecting the sub-set of p network paths from the set of n network paths that have no non-linear links, and the assignment comprises performing a linear route and wavelength assignment operation on the sub-set of p network paths to generate a corresponding set of OSNR values and assigning the network path having a corresponding highest linear OSNR value.

In some aspects, the selecting the network path from the sub-set of p network paths may include: for each path of the sub-set of p paths, determining a sum of utilized wavelengths; identifying q paths from the sub-set of p paths based on the sum of utilized wavelengths of each path; and wherein the selecting the network path from the sub-set of p network paths comprises: selecting the network path having the sum of utilized wavelengths that meets a number of wavelengths threshold.

In some aspects, the number of wavelengths threshold comprises a minimum number of wavelengths utilized by any of the sub-set of p network paths.

A routing and spectrum assignment (RSA) element operative to provide physical layer impairment (PLI) aware network path selection on a Transport Software-Defined Network (T-SDN), the RSA element operative to: receive a connection request to connect a first node with a second node of the T-SDN; receive OSNR measurements from controllers in communication with links of the T-SDN; receive a network utilization parameter for the T-SDN; identify a set of n network paths that connect the first node with the second node; and, select a network path connecting the first node with the second node based on the received OSNR measurements and the received network utilization parameter.

In some aspects, the RSA element may select the network path by selectively applying network path selection methods based on the network utilization parameter.

In some aspects, if the network utilization parameter is below a minimum utilization threshold level, the RSA element may select the network path by identifying network paths that exclude non-linear links; and, assigning the network path from the identified network paths with the highest linear OSNR.

In some aspects, if the network utilization parameter is above a minimum utilization threshold level the RSA element may select the network path by identifying a sub-set of network paths with the highest linear OSNR; and, assigning the network path from the identified sub-set of network paths based on the highest combination of linear OSNR and non-linear OSNR.

In some aspects, wherein if the network utilization parameter is above a maximum utilization threshold level, the RSA element may select the network path by identifying network paths that exclude non-linear links; and, assigning the network path from the identified network paths with the highest linear OSNR.

Unless defined otherwise, all technical and scientific terms used herein have the same meaning as commonly understood by one of ordinary skill in the art to which this invention belongs.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A routing and spectrum assignment (RSA) element operative to provide physical layer impairment (PLI) aware network path selection on a Transport Software-Defined Network (T-SDN), the RSA element operative to:
    receive a connection request to connect a first node with a second node of the T-SDN;
    receive OSNR measurements from controllers in communication with links of the T-SDN;
    receive a network utilization parameter for the T-SDN;
    identify a set of n network paths that connect the first node with the second node; and,
    select a network path, from a sub-set of network paths which exclude paths based on a discriminant, the network path connecting the first node with the second node based on the received OSNR measurements and the received network utilization parameter.

2. The RSA element of claim 1, wherein the network path is selected by selectively applying network path selection methods based on the network utilization parameter.

3. The RSA element of claim 2, wherein if the network utilization parameter is below a minimum utilization threshold level, the network path is selected by a linear path selection in which the discriminant excludes non-linear links; and, assigning the network path from the identified network paths with the highest linear OSNR.

4. The RSA element of claim 3, wherein if the network utilization parameter is below the minimum utilization threshold level, the linear path selection comprises the RSA element is further operative to:
    identify a set of n network paths through the network that connect the first node with the second node and are absent non-linear links,
    select p network paths from the set of n network paths that have the highest linear OSNR levels, and,
    select a network path from the sub-set of p network paths that balances the wavelength utilization between the first node and the second node of the network.

5. The RSA element of claim 2, wherein:
    the discriminant is linear OSNR; and
    if the network utilization parameter is above a minimum utilization threshold level, the network path is selected by identifying a sub-set of network paths with the highest linear OSNR; and, assigning the network path from the identified sub-set of network paths based on the highest combination of linear OSNR and non-linear OSNR.

6. The RSA element of claim 5, wherein if the network utilization parameter is above the minimum utilization threshold level, the sub-set of network paths are identified by:
    performing network path and spectrum assignment operations on the set of n network paths to generate, for each network path a corresponding linear OSNR value and a non-linearity indicator indicating a level of non-linearity along that network path;
    rank sorting the n network paths based on the corresponding linear OSNR values; and,
    including highest ranked network paths and only one network path having a corresponding non-linearity indicator indicating the level of non-linearity along that network path is below a non-linear threshold level.

7. The RSA element of claim 2, in which the discriminant is non-linear links such that if the network utilization parameter is above a maximum utilization threshold level, the network path is selected by identifying network paths that exclude non-linear links; and, assigning the network path from the identified network paths with the highest linear OSNR.

8. The RSA element of claim 7, wherein the identifying network paths that exclude non-linear links comprises:
    selecting a sub-set of p network paths from the set of n network paths that have no non-linear links,
    performing a linear network path and spectrum assignment operation on the sub-set of p network paths to generate a corresponding set of OSNR values, and,
    assigning the network path having a corresponding highest linear OSNR value from the sub-set of p network paths.

9. The RSA element of claim 1, wherein the network utilization parameter is based on at least one of:
    a network blocking probability;
    a network load; and,
    a network congestion metric.

10. The RSA element of claim 1, operative to select the network path, from a sub-set of network paths which exclude paths based on a discriminant, the network path connecting the first node with the second node based on the received OSNR measurements and the received network utilization parameter by:
    rank sorting the set of n network paths based on a linear OSNR value for each path to order the paths from highest OSNR to lowest OSNR;
    evaluating the set of n network paths to identify a sub-set of q network paths, wherein the discriminant is OSNR, starting from the network path with the highest OSNR value until the sub-set q includes one network path with no non-linear values;

evaluating the sub-set of q network paths to obtain for each the network links, updated linear OSNR and updated non-linear OSNR values; and, assigning the network path with the highest combination of updated linear OSNR and updated non-linear OSNR values as the network connection.

11. The RSA element of claim 10, wherein the evaluating the sub-set of q network paths to obtain, for each the network links, updated linear OSNR and updated non-linear OSNR values further comprises:

evaluating, for each link of the q network paths, the updated non-linear OSNR value for that link, and performing non-linear OSNR calculations on that link if the updated non-linear OSNR value is over an OSNR threshold level.

12. The RSA element of claim 1, operative to select the network path, from a sub-set of network paths which exclude paths based on a discriminant, the network path connecting the first node with the second node based on the received OSNR measurements and the received network utilization parameter by:

identifying a set of n network paths through the network that connect the first node with the second node and are absent non-linear links, performing route selection by selecting a sub-set of p network paths from the set of n network paths, wherein the discriminant is OSNR, that have the best linear OSNR, and, selecting a network path from the sub-set of p network paths that meets a number of wavelengths threshold and assigning the selected network path.

13. The RSA element of claim 12, wherein, before the RSA element identifies the set of n network paths, the RSA element is further operative to:

evaluating a network utilization parameter of the network, wherein if the network parameter is below a minimum threshold level, the route selection comprises selecting the sub-set of p network paths from the set of n network paths that have no non-linear links, and the assignment comprises performing a linear path and wavelength assignment operation on the sub-set of p network paths to generate a corresponding set of OSNR values and assigning the network path having a corresponding highest linear OSNR value.

14. The RSA element of claim 12, wherein the network utilization parameter comprises one of:

a network blocking probability;

a network load; and, a network congestion metric.

* * * * *